United States Patent
Okabe et al.

(10) Patent No.: US 8,366,887 B2
(45) Date of Patent: Feb. 5, 2013

(54) HYDROGEN GENERATING SYSTEM AND OPERATING METHOD THEREFOR

(75) Inventors: Masanori Okabe, Nerima-ku (JP); Koji Nakazawa, Utsunomiya (JP); Kenji Taruya, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 764 days.

(21) Appl. No.: 12/542,053

(22) Filed: Aug. 17, 2009

(65) Prior Publication Data
US 2010/0051473 A1    Mar. 4, 2010

(30) Foreign Application Priority Data
Aug. 27, 2008    (JP) .................................. 2008-217641

(51) Int. Cl.
C25B 9/00    (2006.01)
C25B 1/02    (2006.01)

(52) U.S. Cl. ....................................... 204/266; 205/637

(58) Field of Classification Search .................. 204/266; 205/637
See application file for complete search history.

(56) References Cited

U.S. PATENT DOCUMENTS
2005/0199509 A1 * 9/2005 Ross .............................. 205/633
2009/0255826 A1 * 10/2009 McWhinney et al. ........ 205/637

FOREIGN PATENT DOCUMENTS
| JP | 2005-180545 | 7/2005 |
| JP | 2007-100204 | 4/2007 |
| JP | 2007100204 A * | 4/2007 |

OTHER PUBLICATIONS
Japanese Office Action for Application No. 2008-217641, 5 pages, dated Aug. 14, 2012.

* cited by examiner

Primary Examiner — Nicholas A. Smith
(74) Attorney, Agent, or Firm — Nelson Mullins Riley & Scarborough LLP; Anthony A. Laurentano

(57) ABSTRACT

A hydrogen generating system is equipped with a water electrolysis unit for producing hydrogen by performing electrolysis on pure water supplied from a pure water supply apparatus, with a back-pressure valve mechanism disposed in a hydrogen outlet port of the water electrolysis unit. The back-pressure valve mechanism is equipped with a first back-pressure valve, which sets a first back pressure, for discharging hydrogen to the outside of a hydrogen supply passage, and a second back-pressure valve, which sets a second back pressure at a higher pressure than the first back pressure, for extracting high-pressure hydrogen into the hydrogen supply passage.

7 Claims, 5 Drawing Sheets

US 8,366,887 B2

HYDROGEN GENERATING SYSTEM AND OPERATING METHOD THEREFOR

BACKGROUND OF THE INVENTION

1. Field of the Invention

The present invention relates to a hydrogen generating system, which is equipped with a water electrolysis unit for performing electrolysis on water, such that when hydrogen generated by the water electrolysis unit is developed into high-pressure hydrogen at or above a predetermined pressure, the high-pressure hydrogen is extracted into a hydrogen supply passage via a back-pressure valve mechanism, and also relates to an operating method therefor.

2. Description of the Related Art

Recently, there has been proposed systems that supply electrical power or motive power using hydrogen as a fuel, for example, a fuel cell system or the like. For manufacturing hydrogen as a fuel, a water electrolysis apparatus is used, by which water is subjected to electrolysis in order to produce hydrogen (and oxygen).

In such a water electrolysis apparatus, generally, during electrolysis, oxygen is diffused through an electrolyte membrane due to concentration difference, and the diffused oxygen is mixed as impurity oxygen in the generated hydrogen on the order of several tens to several hundreds parts per million (ppm). Hence, there is a concern that such impurity oxygen will act as a catalytic poison in the fuel cell. Accordingly, concerning the degree of purity of hydrogen used in fuel cells, it is preferable for the impurity oxygen contained therein to be at or below 5 ppm, and more preferably, at or below 1 ppm.

Consequently, for removing impurity oxygen from within the generated hydrogen, for example, a method and apparatus for producing high-pressure hydrogen is known, as disclosed in Japanese Laid-Open Patent Publication No. 2007-100204. As shown in FIG. 5, such a high-pressure hydrogen producing apparatus comprises an oxygen high-pressure vessel 1, a differential pressure adjustment apparatus 2, a hydrogen high-pressure vessel 3, an electrolytic cell 4, a moisture-adsorption cylinder 5, a back-pressure valve 6, and a deoxidation cylinder 7.

Pure water inside the oxygen high-pressure vessel 1 is delivered to an anode side of the electrolytic cell 4 via a circulating pump 8, and by supplying electrical energy to the electrolytic cell 4 from a power source 9, electrolysis is carried out on the pure water. Oxygen, which is generated in the electrolytic cell 4 by electrolysis, is delivered to the oxygen high-pressure vessel 1, together with circulated and returned pure water from the circulating pump 8.

Hydrogen generated at the cathode of the electrolytic cell 4 is released to the interior of the hydrogen high-pressure vessel 3 together with permeated water. At this time, the pressure in the oxygen high-pressure vessel 1 and the pressure in the hydrogen high-pressure vessel 3 are kept equal by the differential pressure adjustment apparatus 2.

After hydrogen retained in the hydrogen high-pressure vessel 3 passes through the deoxidation cylinder 7 to remove oxygen contained in the hydrogen, hydrogen as a product gas is obtained as a result of removing moisture therefrom by the moisture-adsorption cylinder 5, which is connected to the back-pressure valve 6.

However, with the aforementioned Japanese Laid-Open Patent Publication No. 2007-100204, in particular, it is difficult for impurity oxygen contained within the hydrogen, which is generated upon start-up of the high-pressure hydrogen producing apparatus, to be eliminated reliably. Therefore, it has been necessary for a reaction system to be used for removing impurity oxygen generated upon start-up, which makes the structure of the apparatus complicated.

In addition, the pressure in the oxygen high-pressure vessel 1 and the pressure in the hydrogen high-pressure vessel 3 are kept at the same pressure. Accordingly, for example, even if the set pressure of the back-pressure valve 6 is changed, the impurity oxygen concentration within the hydrogen, which is generated in the hydrogen high-pressure vessel 3, cannot be reduced, and high-purity hydrogen cannot be produced efficiently.

SUMMARY OF THE INVENTION

The present invention has been made to resolve the above types of problems, and an object of the present invention is to provide a hydrogen generating system and an operating method therefor, which can efficiently eliminate impurity oxygen from hydrogen generated by water electrolysis, and which is capable of obtaining high-purity hydrogen both easily and reliably.

The present invention relates to a hydrogen generating system and an operating method therefor, the hydrogen generating system being equipped with a water electrolysis unit for performing electrolysis on water, such that when hydrogen generated by the water electrolysis unit is developed into high-pressure hydrogen at or above a predetermined pressure, the high-pressure hydrogen is extracted into a hydrogen supply passage via a back-pressure valve mechanism.

The hydrogen generating system comprises a first back-pressure setting mechanism, which sets a first back pressure for operating the back-pressure valve mechanism and discharging hydrogen to the outside of the hydrogen supply passage, and a second back-pressure setting mechanism, which sets a second back pressure at a higher pressure than the first back pressure for operating the back-pressure valve mechanism and extracting high-pressure hydrogen into the hydrogen supply passage.

Further, an operating method for a hydrogen generating system includes the steps of: upon start-up of the water electrolysis unit, discharging hydrogen to the outside of the hydrogen supply passage via the back-pressure valve mechanism, which is set to a first back pressure; and after an oxygen concentration within the hydrogen generated by the water electrolysis unit has been decreased to a predetermined concentration or lower, extracting high-pressure hydrogen into the hydrogen supply passage via the back-pressure valve mechanism, which is set to a second back pressure at a higher pressure than the first back pressure.

According to the present invention, upon start-up of the water electrolysis unit, because the pressure of the generated hydrogen is low, the impurity oxygen contained within the hydrogen is high. Accordingly, by discharging such low purity hydrogen to the outside of the hydrogen supply passage via the back-pressure valve mechanism, which is set to the first back pressure, the low purity hydrogen can be eliminated reliably from the water electrolysis unit.

Next, after the oxygen concentration within the hydrogen has been decreased, high-pressure hydrogen is extracted into the hydrogen supply passage via the back-pressure valve mechanism, which is set to a second back pressure at a higher pressure than the first back pressure. Consequently, high-pressure hydrogen of high-purity, from which impurity oxygen has been eliminated, can be supplied reliably and efficiently to the hydrogen supply passage.

The above and other objects features and advantages of the present invention will become more apparent from the following description when taken in conjunction with the

DESCRIPTION OF THE PREFERRED EMBODIMENTS

Figure 1:
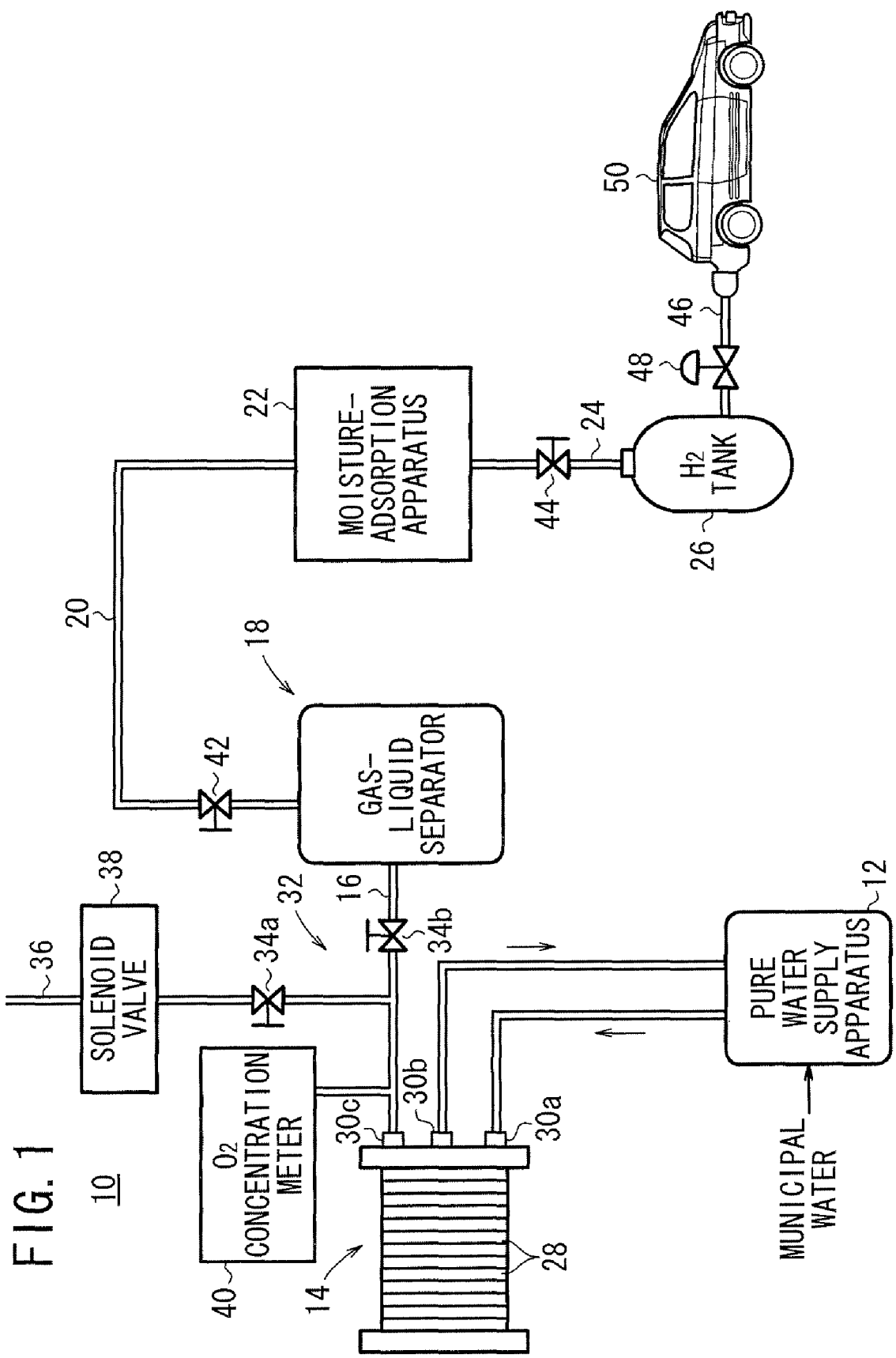
FIG. 1 is an outline structural schematic drawing of a hydrogen generating system to which an operating method according to a first embodiment of the present invention is applied.

As shown in FIG. 1, a hydrogen generating system 10 to which an operating method according to a first embodiment of the present invention is applied is equipped with a water electrolysis apparatus (water electrolysis unit) 14, which is supplied with pure water produced from municipal water by a pure water supply apparatus 12, and which produces high-pressure hydrogen by performing electrolysis on the pure water, a gas-liquid separator (gas-liquid separating unit) 18 that removes moisture contained in the high-pressure hydrogen delivered from the water electrolysis apparatus 14 to a hydrogen lead-out passage 16, a moisture-adsorption apparatus 22 for adsorbing and eliminating moisture contained within the hydrogen supplied from the gas-liquid separator 18 to a hydrogen supply passage 20, and a hydrogen tank 26, which is capable of retaining the hydrogen (dry hydrogen) that is delivered out to a dry hydrogen supply passage 24 connected to the moisture-adsorption apparatus 22. Incidentally, the hydrogen tank 26 may be provided as needed, and the hydrogen tank 26 is capable of being eliminated.

In the water electrolysis apparatus 14, a plurality of water electrolysis cells 28 are stacked, with pipes 30a, 30b and 30c being connected at one end in the stacking direction of the water electrolysis cells 28. The pipes 30a, 30b are in communication with the pure water supply apparatus 12 and function to circulate pure water, whereas the pipe 30c passes via the back-pressure valve mechanism 32 and is connected from the hydrogen lead-out passage 16 to the gas-liquid separator 18.

The back-pressure valve mechanism 32 comprises a first back-pressure valve 34a that constitutes a first back-pressure setting mechanism, and a second back-pressure valve 34b that constitutes a second back-pressure setting mechanism. The first back-pressure valve 34a is disposed in a hydrogen discharge passage 36, and a solenoid valve 38 is disposed downstream from the first back-pressure valve 34a. The set pressure of the first back-pressure valve 34a is set, for example, to 1 MPa (first back pressure), and the set pressure of the second back-pressure valve 34b is set, for example, to 35 MPa (second back pressure).

The first back-pressure valve 34a is set so that the differential pressure (hydrogen pressure–oxygen pressure) between the oxygen side and the hydrogen side of the water electrolysis cells 28 is 200 KPa or greater, and more preferably, 500 KPa or greater.

In the hydrogen lead-out passage 16, for example, an oxygen concentration meter (oxygen concentration detecting mechanism) 40 is arranged as an oxygen concentration detecting mechanism for detecting the oxygen concentration contained within the hydrogen generated by the water electrolysis apparatus 14. When the oxygen concentration detected by the oxygen concentration meter 40 is 10 ppm or less, and more preferably, 5 ppm or less (i.e., an oxygen concentration usable in a solid polymer electrolyte fuel cell), for example, switching from the first back pressure to the second back pressure is carried out.

A valve 42 is arranged in the hydrogen supply passage 20, and the inlet port side of the moisture-adsorption apparatus 22 is connected to the hydrogen supply passage 20. The moisture-adsorption apparatus 22 comprises at least two adsorption towers (not shown), which adsorb water vapor (moisture) contained in the hydrogen by means of physical adsorption, and are filled with a moisture adsorptive agent, which can be regenerated by releasing the moisture to the exterior.

The dry hydrogen supply passage 24 is connected through a valve 44 to the outlet side of the moisture-adsorption apparatus 22. A fuel supply passage 46 is connected through a valve 48 to the hydrogen tank 26, which is arranged in the dry hydrogen supply passage 24. The fuel supply passage 46 is capable of being connected directly, or alternatively via a non-illustrated storage tank, to a fuel tank of a fuel cell vehicle 50.

Operations of the hydrogen generating system 10 shall be described below.

First, upon start-up of the hydrogen generating system 10, pure water, which is produced from municipal water via the pure water supply apparatus 12, is supplied to the water electrolysis apparatus 14. Generation of hydrogen is initiated in the water electrolysis apparatus 14 by performing electrolysis on pure water. At this time, the concentration of impurity oxygen in the generated hydrogen is 100 ppm or greater.

Figure 2:
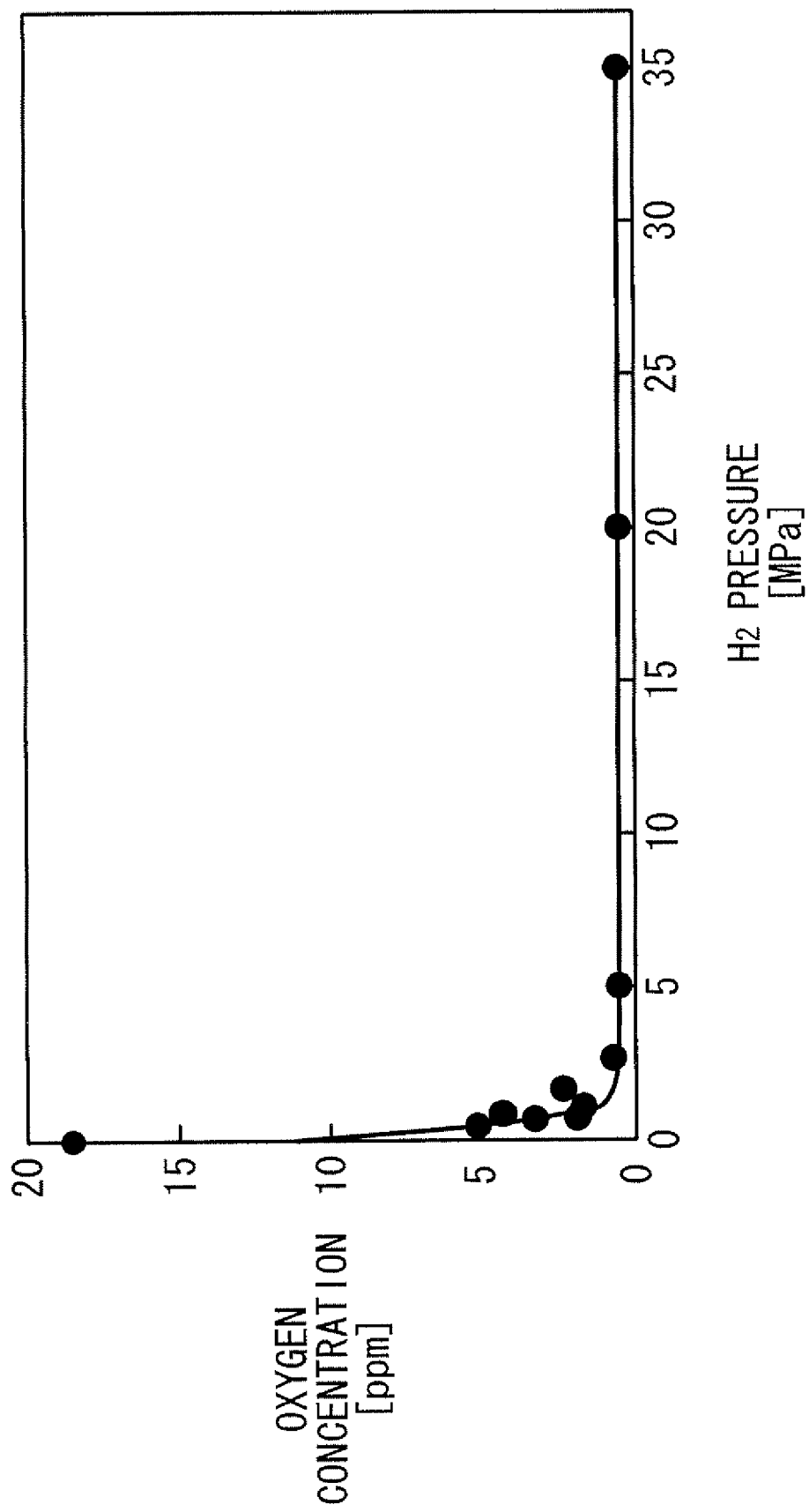
FIG. 2 is an explanatory drawing showing a relationship between hydrogen gas pressure and impurity oxygen concentration.

At the back-pressure valve mechanism 32, the first back-pressure valve 34a and the second back-pressure valve 34b are maintained respectively at predetermined set pressures, while the solenoid valve 38 is opened. Owing thereto, as shown in FIG. 2, the hydrogen pressure inside the water electrolysis apparatus 14 rises, and the impurity oxygen concentration within the hydrogen decreases.

At this time, in the water electrolysis apparatus 14, the back pressure of the oxygen side is maintained at 100 KPa, while on the other hand, the back pressure of the hydrogen side is kept at 1 MPa, which is the set pressure of the first back-pressure valve 34a. Accordingly, generation of hydrogen is continued under a condition where the differential pressure (hydrogen pressure–oxygen pressure) is maintained at a maximum of 900 KPa.

Additionally, when the hydrogen pressure has reached the first pressure of 1 MPa, the impurity oxygen concentration within the hydrogen is approximately 30 ppm. This is because, inside the water electrolysis apparatus 14 and the hydrogen lead-out passage 16, low purity hydrogen, which is generated at a time when the differential pressure between the hydrogen pressure and the oxygen pressure is low, namely, at the time of initial start-up, remains in a large amount.

Next, when the hydrogen pressure inside the water electrolysis apparatus 14 exceeds 1 MPa, the first back-pressure valve 34a is opened, and the low-purity hydrogen is discharged to the hydrogen discharge passage 36 through the preliminarily-opened solenoid valve 38. Accordingly, hydrogen that includes a large amount of impurity oxygen therein, which was generated in the water electrolysis apparatus 14 upon initial start-up thereof, is discharged to the hydrogen discharge passage 36, which is located on the outside of the hydrogen supply passage, and therefore the impurity oxygen concentration contained within the generated hydrogen gradually diminishes.

When the oxygen concentration meter 40 detects that the impurity oxygen concentration is, for example, 5 ppm or below, the solenoid valve 38 is closed and discharging of hydrogen from the hydrogen discharge passage 36 is halted. Consequently, the hydrogen pressure in the water electrolysis apparatus 14 rises further above 1 MPa. When the hydrogen pressure in the water electrolysis apparatus 14 becomes 5 MPa or greater, the impurity oxygen concentration within the generated hydrogen drops to 1 ppm or below, and suitable hydrogen is obtainable as a product gas (see FIG. 2).

When the hydrogen pressure inside the water electrolysis apparatus 14 rises further and reaches 35 MPa, the second back-pressure valve 34b is opened. Accordingly, it becomes possible for high-pressure hydrogen to be extracted to the exterior of the water electrolysis apparatus 14, and comparatively high-pressure hydrogen, which contains water vapor therein, generated by the water electrolysis apparatus 14, is delivered into the gas-liquid separator 18 via the hydrogen lead-out passage 16. The water vapor contained in the hydrogen is separated out from the hydrogen by the gas-liquid separator 18, whereas the hydrogen itself is supplied into the hydrogen supply passage 20.

The hydrogen supplied to the hydrogen supply passage 20 is delivered to the moisture-adsorption apparatus 22. In the moisture-adsorption apparatus 22, moisture contained in the hydrogen is adsorbed, and thus, hydrogen in a dried state (dry hydrogen) is obtained. Then, the dry hydrogen is directed out to the dry hydrogen supply passage 24.

The dry hydrogen directed out to the dry hydrogen supply passage 24 is stored in the hydrogen tank 26. By opening the valve 48 as needed, the dry hydrogen stored in the hydrogen tank 26 is filled into a fuel cell vehicle 50 through the fuel supply passage 46.

In this case, according to the first embodiment, the back-pressure valve mechanism 32 is disposed in the pipe 30c on the hydrogen outlet side of the water electrolysis apparatus 14. The back-pressure valve mechanism 32 is equipped with the first back-pressure valve 34a, which is set at the first back pressure of 1 MPa, and the second back-pressure valve 34b, which is set at the second back pressure of 35 MPa higher than the first back pressure. On the other hand, the back pressure on the oxygen side is maintained at 100 KPa.

Consequently, at a time when the water electrolysis apparatus 14 is started-up, since the pressure of the generated hydrogen is low, the impurity oxygen concentration within the hydrogen is high, so that when the hydrogen pressure has reached 1 MPa, hydrogen that contains a large amount of impurity oxygen therein is discharged to the hydrogen discharge passage 36 through the solenoid valve 38, which is opened beforehand.

At this time, when the hydrogen pressure reaches 1 MPa, the impurity oxygen concentration within the hydrogen is 5 ppm or lower. Therefore, by closing the solenoid valve 38, high-purity high-pressure hydrogen can be obtained. When the high-pressure hydrogen has reached a predetermined pressure (35 MPa), the second back-pressure valve 34b is opened, and the high-pressure hydrogen is supplied into the hydrogen supply passage 20. Therefore, high-purity high-pressure hydrogen from which impurity oxygen has been removed, can be supplied reliably and efficiently into the hydrogen supply passage 20.

Further, according to the first embodiment, concerning the timing for switching between the first back-pressure valve 34a and the second back-pressure valve 34b, such switching is performed when the impurity oxygen concentration detected by the oxygen concentration meter 40 is at or below 10 ppm, more preferably at or below 5 ppm. However, the invention is not necessarily limited by this feature. For example, a passage of time may be measured from initiation of the water electrolysis apparatus 14, and when it is detected that a predetermined time interval has elapsed, switching can be carried out from the first back-pressure valve 34a to the second back-pressure valve 34b.

Further, a control may be performed such that the solenoid valve 38 is closed after a certain time of period has elapsed from the time when it has been detected by a flow meter or the like that discharging of hydrogen from the hydrogen discharge passage 36 has started by opening the first back-pressure valve 34a.

Figure 3:
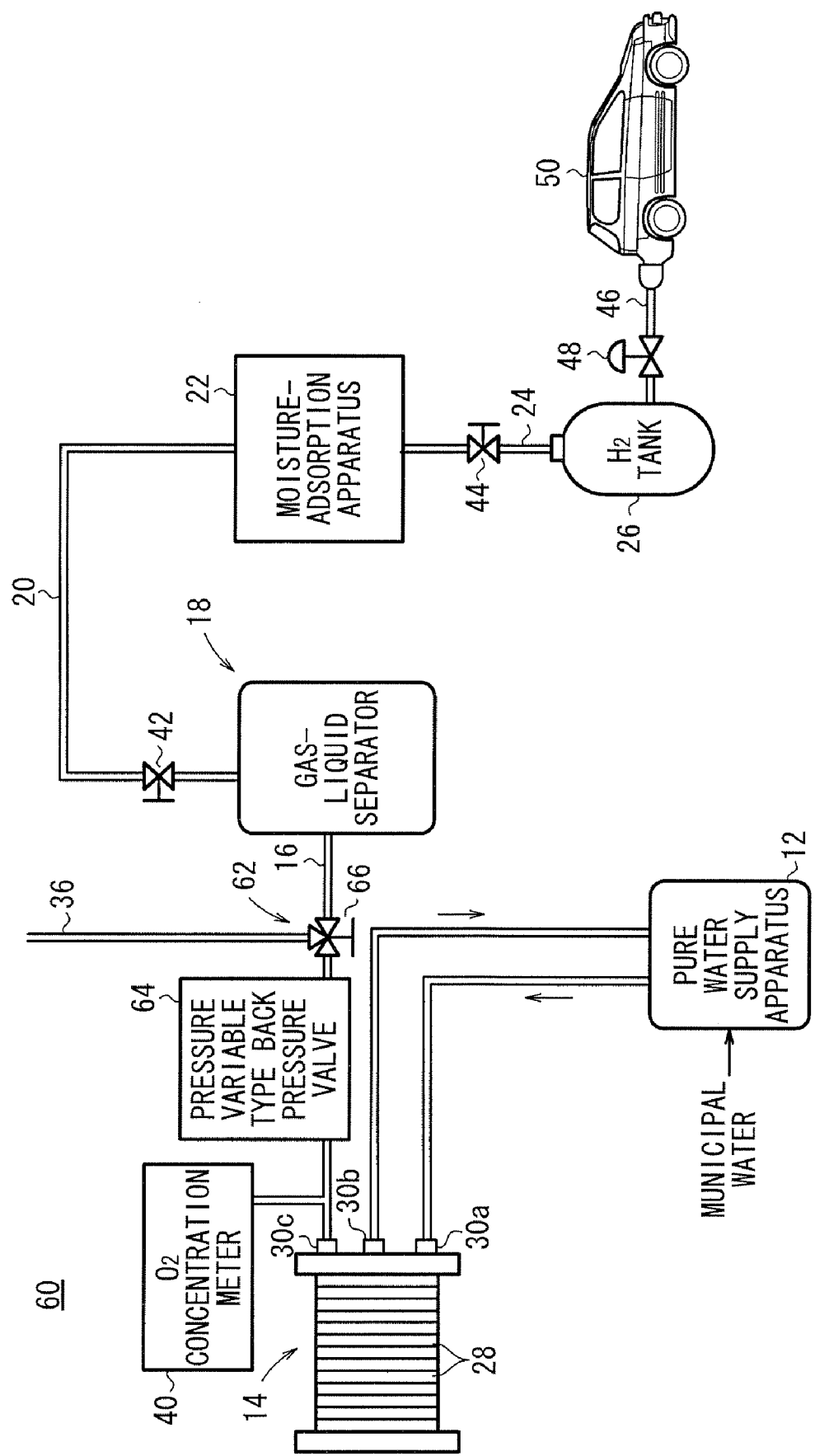
FIG. 3 is an outline structural schematic drawing of a hydrogen generating system to which an operating method according to a second embodiment of the present invention is applied.

FIG. 3 is an outline structural schematic drawing of a hydrogen generating system 60 to which an operating method according to a second embodiment of the present invention is applied. Structural elements which are the same as those of the hydrogen generating system 10 according to the first embodiment are designated using the same reference characters, and detailed descriptions of such features have been omitted. Further, in the third embodiment of the invention to be described below, similarly, detailed descriptions of the same features have been omitted.

In the water electrolysis apparatus 14 constituting the hydrogen generating system 60, a back-pressure valve mechanism 62 is disposed in the pipe 30c, which forms the hydrogen outlet. The back-pressure valve mechanism 62 is equipped with a setting back-pressure variable type back-pressure valve 64, with a three-way valve 66 being arranged on the downstream side of the back-pressure valve 64.

The three-way valve 66 is switchable between a position placing the water electrolysis apparatus 14 and the hydrogen discharge passage 36 in communication with each other, and a position placing the water electrolysis apparatus 14 and the gas-liquid separator 18 in communication with each other. The set pressure of the back-pressure valve 64 is switchable between 1 MPa as a first back pressure and 35 MPa as a second back pressure.

According to the second embodiment, first, the back-pressure valve 64 is set at 1 MPa and a hydrogen generating operation is initiated by the water electrolysis apparatus 14. At this time, similar to the first embodiment, the back pressure on the oxygen side is roughly 100 KPa, and impurity oxygen, which is contained in the hydrogen generated upon start-up of the water electrolysis apparatus 14, is discharged to the hydrogen discharge passage 36 via the three-way valve 66 by opening of the back-pressure valve 64 at a time when the hydrogen pressure of the water electrolysis apparatus 14 reaches 1 MPa.

Next, the three-way valve 66 is manipulated to a position placing the water electrolysis apparatus 14 and the gas-liquid separator 18 in communication with each other, while the set pressure of the back-pressure valve 64 is changed to 35 MPa. Owing thereto, due to the hydrogen generation process being continued by the water electrolysis apparatus 14, a predetermined level of high-pressure hydrogen is obtained, the high-pressure hydrogen causes the back-pressure valve 64 to be opened, and the high-pressure hydrogen is supplied to the gas-liquid separator 18 through the three-way valve 66.

Accordingly, with the second embodiment, the back-pressure valve 64 can be used dually as the first back-pressure setting mechanism, as well as the second back-pressure setting mechanism. Therefore, low purity hydrogen (hydrogen in which the impurity oxygen concentration thereof is high), which is generated upon start-up of the water electrolysis apparatus 14, firstly, is discharged outside of the hydrogen supply passage 20 when the first back pressure (1 MPa) is reached. As a result thereof, high-purity high-pressure hydrogen can be supplied reliably and efficiently into the hydrogen supply passage 20. Thus, the same effects as the above-described first embodiment are obtained.

Figure 4:
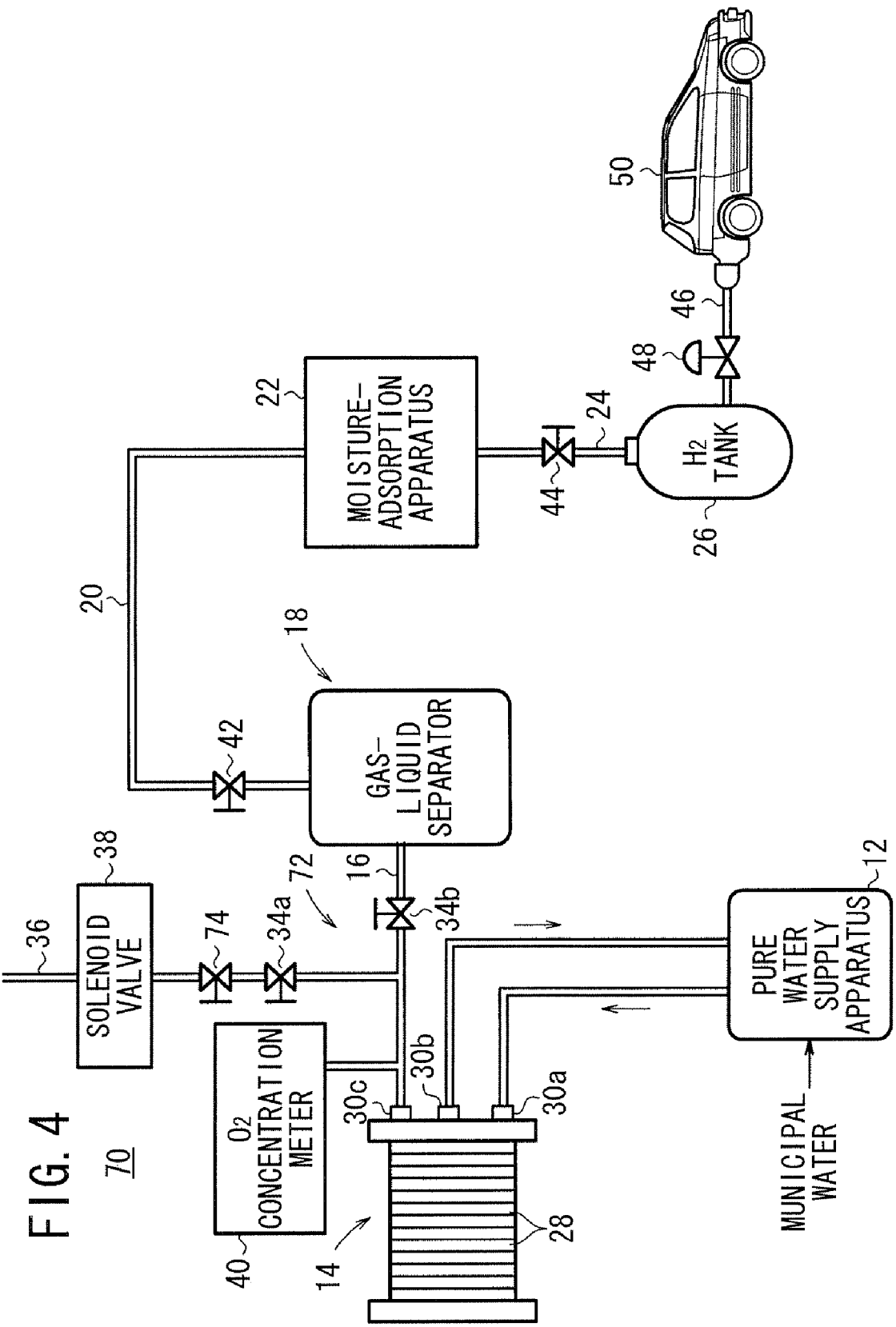
FIG. 4 is an outline structural schematic drawing of a hydrogen generating system to which an operating method according to a third embodiment of the present invention is applied.
Figure 5:
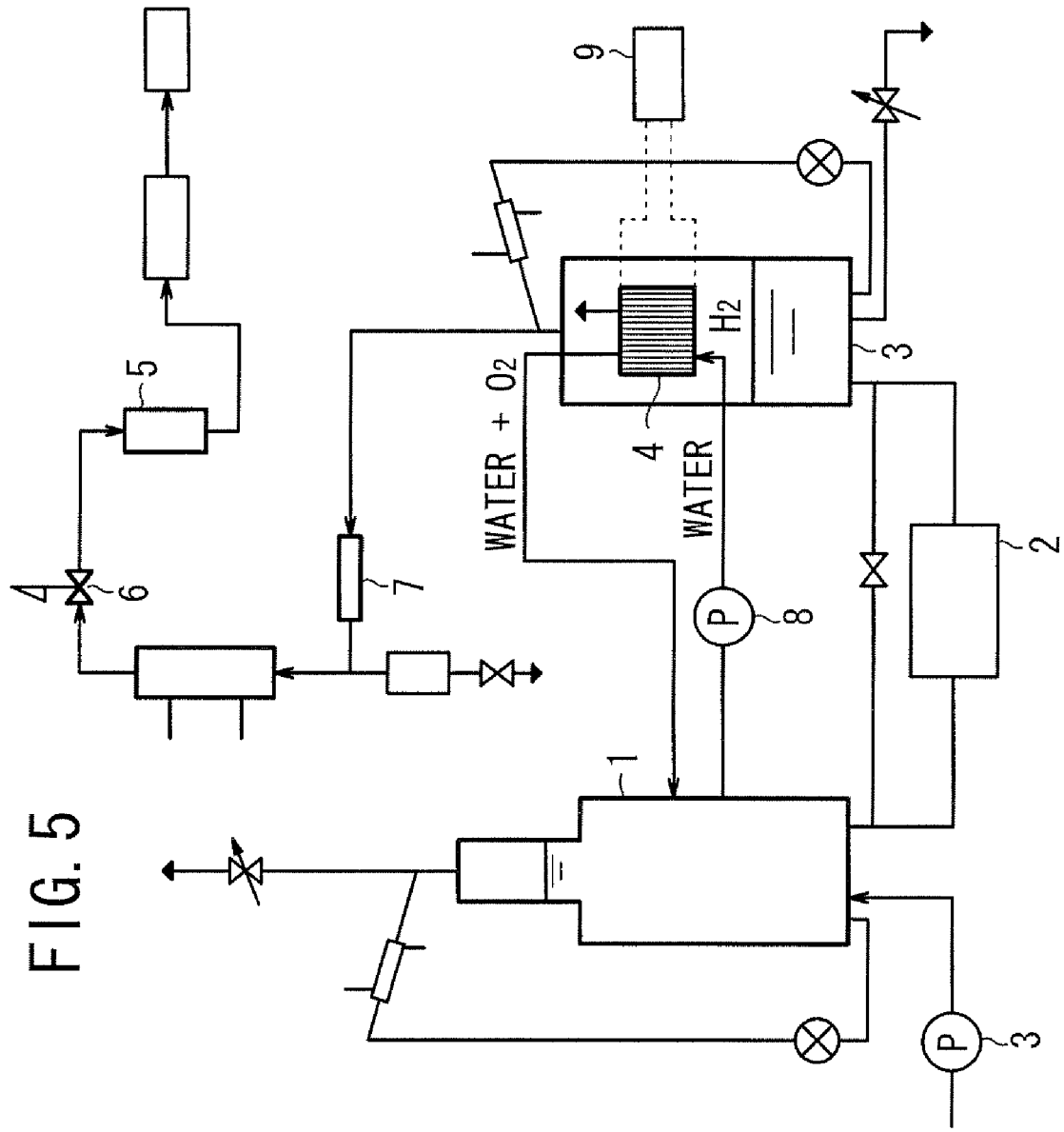
FIG. 5 is an outline schematic drawing of an apparatus for producing high-pressure hydrogen, as disclosed in Japanese Laid-Open Patent Publication No. 2007-100204.

FIG. 4 is an outline structural schematic drawing of a hydrogen generating system 70 to which an operating method according to a third embodiment of the present invention is applied.

In the water electrolysis apparatus 14 constituting the hydrogen generating system 70, a back-pressure valve mechanism 72 is disposed in the pipe 30c, which forms the hydrogen outlet. The back-pressure valve mechanism 72 is equipped with a first back-pressure valve 34a and a pressure-reducing valve 74 that together make up a first back-pressure setting mechanism, and a second back-pressure valve 34b that makes up a second back-pressure setting mechanism.

According to the third embodiment, the first back-pressure valve 34a and the pressure-reducing valve 74 are provided as the first back-pressure setting mechanism, and together therewith, the set pressure of the first back-pressure valve 34a and the pressure-reducing valve 74 is set, for example, at 1 MPa. Owing thereto, in particular, the solenoid valve 38 can be set at a low pressure, which is economical.

While the invention has been particularly shown and described with reference to preferred embodiments, it will be understood that variations and modifications can be effected thereto by those skilled in the art without departing from the scope of the invention as defined by the appended claims.

What is claimed is:

1. A hydrogen generating system, which is equipped with a water electrolysis unit for performing electrolysis on water, such that when hydrogen generated by the water electrolysis unit is developed into high-pressure hydrogen at or above a predetermined pressure, the high-pressure hydrogen is extracted into a hydrogen supply passage via a back-pressure valve mechanism, comprising:
   a first back-pressure setting mechanism including a first back-pressure valve, which sets a first back pressure for operating the back-pressure valve mechanism and discharging the hydrogen to the outside of the hydrogen supply passage; and
   a second back-pressure setting mechanism including a second back-pressure valve, which sets a second back pressure at a higher pressure than the first back pressure for operating the back-pressure valve mechanism and extracting the high-pressure hydrogen into the hydrogen supply passage.

2. The hydrogen generating system according to claim 1, further comprising an oxygen concentration detecting mechanism for detecting an oxygen concentration in the hydrogen generated by the water electrolysis unit.

3. The hydrogen generating system according to claim 1, wherein the first back-pressure setting mechanism further comprises a pressure-reducing valve.

4. An operating method for a hydrogen generating system, which is equipped with a water electrolysis unit for performing electrolysis on water, such that when hydrogen generated by the water electrolysis unit is developed into high-pressure hydrogen at or above a predetermined pressure, the high-pressure hydrogen is extracted into a hydrogen supply passage via a back-pressure valve mechanism, comprising the steps of:
   upon start-up of the water electrolysis unit, discharging the hydrogen to the outside of the hydrogen supply passage via the back-pressure valve mechanism, which is set to a first back pressure; and
   after an oxygen concentration within the hydrogen generated by the water electrolysis unit has been decreased to a predetermined concentration or lower, extracting the high-pressure hydrogen into the hydrogen supply passage via the back-pressure valve mechanism, which is set to a second back pressure at a higher pressure than the first back pressure,
   wherein the back-pressure valve mechanism includes a first back-pressure valve and a second back-pressure valve.

5. The operating method for a hydrogen generating system according to claim 4, wherein the back-pressure valve mechanism further comprises a pressure-reducing valve connected to the first back-pressure valve.

6. A hydrogen generating system, which is equipped with a water electrolysis unit for performing electrolysis on water, such that when hydrogen generated by the water electrolysis unit is developed into high-pressure hydrogen at or above a predetermined pressure, the high-pressure hydrogen is extracted into a hydrogen supply passage via a back-pressure valve mechanism, comprising:
   a first back-pressure setting mechanism, which sets a first back pressure for operating the back-pressure valve mechanism and discharging the hydrogen to the outside of the hydrogen supply passage; and
   a second back-pressure setting mechanism, which sets a second back pressure at a higher pressure than the first back pressure for operating the back-pressure valve mechanism and extracting the high-pressure hydrogen into the hydrogen supply passage,
   wherein the back-pressure valve mechanism includes a setting back-pressure variable type back-pressure valve constituting the first back-pressure setting mechanism and the second back-pressure setting mechanism.

7. An operating method for a hydrogen generating system, which is equipped with a water electrolysis unit for performing electrolysis on water, such that when hydrogen generated by the water electrolysis unit is developed into high-pressure hydrogen at or above a predetermined pressure, the high-pressure hydrogen is extracted into a hydrogen supply passage via a back-pressure valve mechanism, comprising the steps of:
   upon start-up of the water electrolysis unit, discharging the hydrogen to the outside of the hydrogen supply passage via the back-pressure valve mechanism, which is set to a first back pressure; and
   after an oxygen concentration within the hydrogen generated by the water electrolysis unit has been decreased to a predetermined concentration or lower, extracting the high-pressure hydrogen into the hydrogen supply passage via the back-pressure valve mechanism, which is set to a second back pressure at a higher pressure than the first back pressure,
   wherein the back-pressure valve mechanism includes a setting back-pressure variable type back-pressure valve constituting the first back-pressure setting mechanism and the second back-pressure setting mechanism.

* * * * *